United States Patent
Malwankar et al.

(10) Patent No.: US 10,241,722 B1
(45) Date of Patent: Mar. 26, 2019

(54) PROACTIVE SCHEDULING OF BACKGROUND OPERATIONS FOR SOLID STATE DRIVES

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Sundar Kanthadai, Fremont, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 14 days.

(21) Appl. No.: 15/606,890

(22) Filed: May 26, 2017

Related U.S. Application Data

(60) Provisional application No. 62/342,721, filed on May 27, 2016.

(51) Int. Cl.
*G06F 12/02* (2006.01)
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0628* (2013.01); *G06F 3/0683* (2013.01); *G06F 3/0688* (2013.01); *G06F 12/0246* (2013.01)

(58) Field of Classification Search
None
See application file for complete search history.

(56) References Cited

U.S. PATENT DOCUMENTS

2015/0052370 A1* 2/2015 Hars ................. G06F 12/14
   713/193
2017/0322847 A1* 11/2017 Park ................. G06F 11/2058

* cited by examiner

*Primary Examiner* — Brian R Peugh
(74) *Attorney, Agent, or Firm* — Lowenstein Sandler LLP

(57) ABSTRACT

A processing device of a storage server that manages a plurality of SSDs receives to read data. The processing device determines a first SSD of the plurality of SSDs on which the data is stored, and determines that the first SSD is performing a background operation. The processing device determines whether the data is located on a block of the first SSD that will be unavailable during the background operation. Responsive to determining that the data is located on the block of the first SSD, the processing device reconstructs the data based on additional data on one or more remaining SSDs of the plurality of SSDs. The processing device then generates a response to the request that includes the data.

20 Claims, 8 Drawing Sheets

PROACTIVE SCHEDULING OF BACKGROUND OPERATIONS FOR SOLID STATE DRIVES

RELATED APPLICATIONS

The present application claims the benefit of U.S. Provisional Application No. 62/342,721 filed May 27, 2016, which is incorporated herein by reference.

FIELD OF TECHNOLOGY

This disclosure relates generally to the field of data storage and in particular to background operations for solid state storage devices.

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. Low latency is an important performance metric for SSDs. Most SSDs have average read latencies that may span a wide range, which can cause problems to applications and hosts that access data on these drives. This can be especially problematic during periods where data on an SSD is unavailable due to the performance of background operations such as erase operations and garbage collection. Thus, latency consistency can be an important metric for applications and hosts accessing data on SSDs.

BRIEF DESCRIPTION OF THE DRAWINGS

The embodiments described herein will be understood more fully from the detailed description given below and from the accompanying drawings.

DETAILED DESCRIPTION

Figure 1:
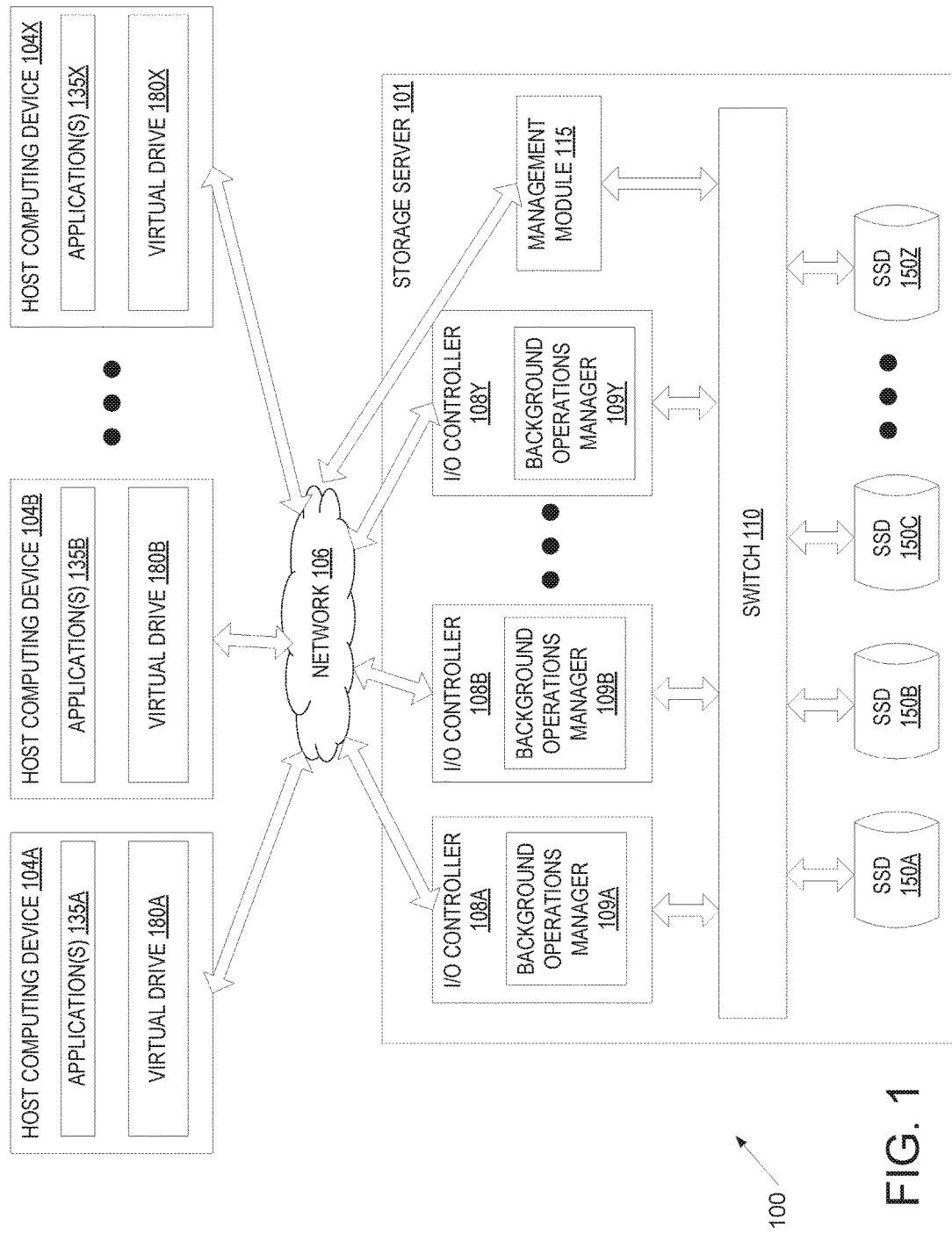
FIG. 1 is a block diagram example of a network architecture, in which embodiments described herein may operate.

Described herein are systems and methods that enable and implement proactive scheduling of background operations for solid state drives (SSDs) to minimize read latency. When applications access data from storage arrays, the performance of the applications may rely on receiving the data in a consistent amount of time across multiple requests. Read latencies provided by SSDs can be low and can provide a significant boost to application performance. However, if an SSD's read latency varies significantly from one request to another it can have negative effects on dependent applications. Additionally, hosts that access that SSD may apply a large buffer to accommodate the occasional slow response. However, at most times that large buffer is underutilized. By minimizing read latency on the storage server, the buffer that is used by a host for reads may be reduced. Moreover, in some implementations, when a read request takes a long period of time to complete, other requests in queue behind the read request may be delayed. This, in turn, may consume system resources that may otherwise be used by new requests. Such problems can be mitigated by minimizing read latency on the storage server.

Solid state drives (SSDs) can provide low latency for read requests in many situations. However, repeated writing and re-writing of data to SSDs typically involves occasionally reclaiming blocks that are discarded as a part of the SSD log structure. This process can involve the performance of background operations by the SSD such as erase operations or "garbage collection" operations. Subsequent reads of a block of an SSD that is being accessed by a background operation process may incur an exponentially higher latency (often orders of magnitude higher) than would otherwise be observed by a normal read request. In many cases, a read may be locked out because of a background operation for a longer period of time than would be required to reconstruct that block using a recovery process associated with a RAID (Redundant Array of Independent Disks) array. Embodiments mitigate or eliminate the high latency associated with such read requests.

Embodiments described herein provide a background operations manager component of a storage server I/O controller that can provide minimized read latency for read requests sent to solid state drives in a storage array. The background operations manager can generate a background operation schedule for an SSD. The background operations manager can, upon receiving a read request, determine from the background operation schedule whether the data to satisfy the request is located on a block of an SSD that is unavailable due to an executing background operation. If so, the background operations manager can then initiate recovery of data needed to satisfy a pending read request if the amount of time needed to perform the recovery is less than the time needed to complete the background operation. Since the latency incurred due to a background operation can be orders of magnitude higher than an average read, embodiments described herein can provide that the latency for read requests is no greater than the time needed to complete recovery of the portion of the SSD that contains the requested data.

In embodiments, the I/O controller may receive a request from a remote computing device (e.g., a remote server) to read data from one of a group of SSDs on a storage server. The I/O controller may determine the particular SSD of the group of SSDs on which the data is stored. The I/O controller may determine, based on a generated schedule, whether the particular SSD is performing a background operation at the time of the read request. The I/O controller may then determine whether the data needed to satisfy the read request is located on a block of the SSD that will be unavailable during the background operation. Responsive to determining that the data is located on an unavailable block of the SSD, the I/O controller may reconstruct the data based on additional data on one or more of the remaining SSDs of the group. Responsive to determining that the data is located on a block of the SSD that will be available during the background operation, the I/O controller may retrieve the data from the available block. The I/O controller may then generate a response to the read request that includes the reconstructed or retrieved data.

FIG. 1 is a block diagram example of a network architecture 100, in which embodiments described herein may operate. The network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), Infiniband®, serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes multiple I/O controllers 108A, 108B through 108Y connected to multiple solid state drives (SSDs) 150A, 150B, 150C through 150Z via a switch 110. The SSDs 150A-Z may be SAS/SATA drives, non-volatile memory express (NVMe) drives, small computer system interface (SCSI) over PCIe (SOP) drives, or solid state drives that communicate using different protocols. The number of SSDs included in storage server 101 may be less than 10 to more than 100. The solid state drives may have the same or different storage capacities. In some implementations, the number of host computing devices 104A-X, the number of I/O controllers 108A-Y, and the number of SSDs 150A-Z may be different from each other.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to. Responsive to such a read or write request, the host computing device 104A-X encapsulates a read or write request into a message (e.g., into an Ethernet packet) and sends the message to the I/O controller 108A-X that is assigned to that host computing device 104A-X.

When the I/O controller 108A-Y receives a read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. For example, if a read command is received, the I/O controller 108A-Y may determine which SSDs 150A-Z store the information to be read as well as which physical addresses on those SSDs the data should be read from.

The I/O controller 108A-Y may then generate one or more sub-commands directed to the determined SSDs 150A-Z to write data to those SSDs or read data from those SSDs 150A-Z. The I/O controller 108A-Y may additionally allocate buffer space for each of the sub-commands in a memory of the I/O controller 108A-Y. Once all sub-commands associated with a read command have been received from the applicable SSDs 150A-Z, I/O controller 108A-Y may then combine the data of each of the sub-commands that was stored in the buffer space and return the combined data as a response to the read command received from host computing device I/O controllers 108A-Y may additionally include array configuration information for the SSDs 150A-Z that may be used to reconstruct data of one or more virtual drives 180A-X if one or more of the SSDs 150A-Z becomes unavailable. The SSDs 150A-Z may become unavailable due to a drive failure, performance degradation due to execution of a background operation (e.g., an erasure operation, storage reclamation processing such as garbage collection, etc.), or the like. If a read command is received while one or more SSDs 150A-Z are unavailable, an I/O controller may retrieve data from the available SSDs and then reconstruct missing data that is stored by the unavailable SSD (or unavailable SSDs) from the retrieved data. I/O controller 108A-Y may reconstruct the missing data by executing a formula to recompute the missing data using standard recovery algorithms (e.g., Reed-Solomon). I/O controller 108A-Y may then satisfy the read command using the reconstructed data.

Switch 110 is a multi-port bridge that connects I/O controllers 108A-Y to SSDs 150A-Z. Switch 110 manages the flow of data within storage server 101 by connecting specific I/O controllers 108A-Y to specific SSDs 150A-Z on a message by message basis, allowing the switch 110 to regulate the flow of traffic. Each I/O controller 108A-Y and each SSD 150A-Z connected to switch 110 can be identified using a unique address (e.g., a unique port address) of the I/O controller or SSD. Switch 110 may be a PCIe switch, an Ethernet switch, a SAS or SATA expander, a USB switch, or other type of switch.

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives, SSDs are more resilient, consume less power, and have lower latency (access times). In one embodiment. SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. SSDs 150A-Z may include one or more ports (e.g., PCIe ports) to connect to switch 110. SSDs 150A-Z may connect to switch 110 via PCIe, SCSI, SAS, USB, or other connection protocols.

Each SSD 150A-Z has a controller and a storage area that includes memory (e.g., NAND Flash non-volatile memory) to store data. The storage area is divided into pages, which is the smallest unit of storage to which data may be stored. SSD pages may have sizes based on a configuration of an SSD. For example, SSDs 150A-Z may have pages that are 4 kilobytes (kB), 8 kB, or 16 kB. However, other page sizes are also possible. SSD pages are grouped into blocks. Each block contains a particular number of pages, which is again dependent on a design of a particular SSD. Typical SSDs have blocks that include 256 pages. Notably, conventionally an SSD may only perform a write or a read to a single page in a block at a time. In some implementations SSDs 150A-Z may additionally include a background operations manager to reconstruct data to service read requests for data that is unavailable due to executing background operations as described below.

For SSDs such as Flash SSDs, to write over the contents of a memory page, that memory page must first be erased. However, SSDs such as Flash SSDs have asymmetric write and erase capabilities. In particular, for Flash memory devices reads and writes are performed on individual memory pages. However, erase operations are not performed on individual memory pages. Instead, erase operations are performed on entire blocks. Accordingly, rather than re-writing over a given memory page when contents of that memory page are changed, that specific memory page is marked as invalid and the changed data is written to a new memory page.

In order to reuse the invalid memory pages, the SSDs 150A-Z occasionally perform background operations such as erasure operations or garbage collection. To perform garbage collection, an SSD may enter into a garbage collection mode and perform one or more garbage collection operations. Garbage collection operations may include first determining which blocks have a number of invalid memory pages that exceeds a threshold. For such blocks that have numerous invalid memory pages, the contents of valid memory pages from the blocks are copied to memory pages in other blocks. Once this is completed, all of the memory pages in those blocks having the numerous invalid memory pages are erased. The memory pages in those blocks may then be written to again.

For solid state storage devices such as Flash SSDs, erase operations typically take significantly more time to complete than either read or write operations. For example, for current Flash SSDs read operations are typically completed in tens to hundreds of microseconds (e.g., about 50-90 microseconds) and write operations are typically completed in about 1-2 milliseconds (ms). However, erase operations are typically performed in around 10 milliseconds. As a result, garbage collection operations are typically completed in a time frame that is significantly greater than the time frame for read and write operations. If a read or write operation is requested while one or more SSDs 150A-Z are in garbage collection mode, a requestor typically waits until the garbage collection is complete before the read or write command is satisfied. This can introduce significant lag. Embodiments described herein minimize or eliminate such lag through the use of scheduled background operations for an array of SSDs, as discussed in detail below.

Storage server 101 additionally includes a management module 115. Management module 115 may be a device configured to perform particular operations with regards to management of the array of SSDs 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of SSDs 150A-Z and further determines configurations for the one or more virtual drives 180A-X. For example, management module 115 may determine which virtual drives 180A-X map to which physical SSDs and which portions of those SSDs the virtual drives map to. Once these configurations are determined, management module 115 may send these configurations to the I/O controllers 108A-Y for implementation. Management module 115 additionally performs discovery operations and may be responsible for paring I/O controllers 108A-Y with host computing devices 104A-X. Discovery operations may be initiated when storage server 101 powers on and/or to connect host computing devices to new or updated virtual drives.

The management module 115 may additionally generate and manage a background operation schedule for the SSDs 150A-Z. Management module 115 may determine the background operation schedule based on a particular array configuration and/or based on information about the SSDs, such as maximum amounts of time for them to complete background operation operations, a minimum frequency for performing background operations, and so on. In some implementations, management module 115 may receive one or more attributes associated with a background operation to be executed by an SSD. For example, management module 115 may receive the duration of a background operation for a particular SSD. Management module 115 may also receive a maximum time interval for executing the background operation (e.g., the maximum amount of time between performing garbage collection operations, which may be equivalent to the minimum frequency for performing the garbage collection operations). Based on this information, management module 115 may allocate a time window for each SSD 150A-Z. The background operation schedule includes the background operation time windows for each SSD. Management module 115 may then notify each of the SSDs 150A-Z of their allotted time windows and additionally send copies of the background operation schedule to the I/O controllers 108A-Y.

Each SSD 150A-Z performs background operations during their allotted time windows, and refrains from performing background operations outside of the allotted time windows. Accordingly, when an I/O controller 108A-Y receives a read command, it can use the background operation schedule to determine which, if any, SSDs 150A-Z are undergoing background operations. Rather than waiting for an SSD to complete the background operation, the I/O controller 108A-Y may retrieve data from other SSDs in the array and reconstruct data of the SSD performing the background operation. This reconstructed data may then be used (potentially along with other data stored in the other SSDs) to satisfy the read request. This can significantly reduce the latency introduced by background operations of SSDs.

Each I/O controller 108A-Y may include a background operations manager 109A-Y that manages pending read commands to achieve the reduced latency for responses to the read commands described above. Upon receiving a request to read data from one of host computing devices 104A-X, background operations manager 109A-Y may determine an SSD of the SSDs 150A-Z in storage server 101 on which the data is stored. Background operations manager 109A-Y may then determine whether that SSD is performing a background operation that renders the SSD unavailable. Background operations manager 109A-Y may make this determination by comparing the time of the read request to a time window during which the SSD is to perform a background operation according to the schedule. In some implementations, background operations manager 109A-Y may access the schedule of background operations generated by management module 115 as described above. Alternatively, background operations manager 109A-Y may generate the schedule of background operations itself.

In some embodiments, an SSD 150A-Z sends to the I/O controllers 108A-Y that are connected to the SSD 150A-Z an indication of a block (or multiple blocks) for which background operations are to occur. The SSD 150A-Z may also send to the I/O controllers 108A-Y a list of valid addresses associated with indicated blocks. The SSD 150A-Z may send the indication of the block and/or the list of valid addresses prior to beginning the background operation or during performance of the background operation.

If the read request is received within a time window during which the SSD is to perform a background operation according to the schedule, background operations manager 109A-Y may then determine whether the data to satisfy the read request is located on a block of the SSD that will be unavailable during the background operation. If so, background operations manager 109A-Y may reconstruct the data to satisfy the request based on additional data on one or more of the remaining SSDs of SSDs 150A-Z in storage server 101. If the data to satisfy the request is located on a different block of the SSD (e.g., a block that will not be unavailable during the background operation), background operations manager 109A-Y may retrieve the data from the available block. Alternatively, if background operations manager 109A-Y determines that any block on that SSD is unavailable due to a background operation, it may reconstruct the data for any read request directed to that SSD regardless of whether the block to satisfy the read request is available or not.

In some implementations, background operations manager 109A-Y may first determine the progress of the background operation before reconstructing the data to satisfy the request. Background operations manager 109A-Y may determine the amount of time needed to reconstruct the data and if that amount of time is greater than the amount of time remaining until the time window for the background operation is closed, then background operations manager 109A-Y may wait for the background operation to complete rather than reconstruct the data. Once the data has been reconstructed or retrieved from an available block, background operations manager 109A-Y may generate a response to the read request using the reconstructed or retrieved data.

Host computing devices 104A-X may each include a physical machine and/or a virtual machine hosted by a physical machine. The physical machine may be a rack-mount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C through 150Z of storage server 101). Additionally, a virtual drive 180A-X may map a logical storage address space to physical storage address spaces of storage devices on multiple different storage servers.

Figure 2A:
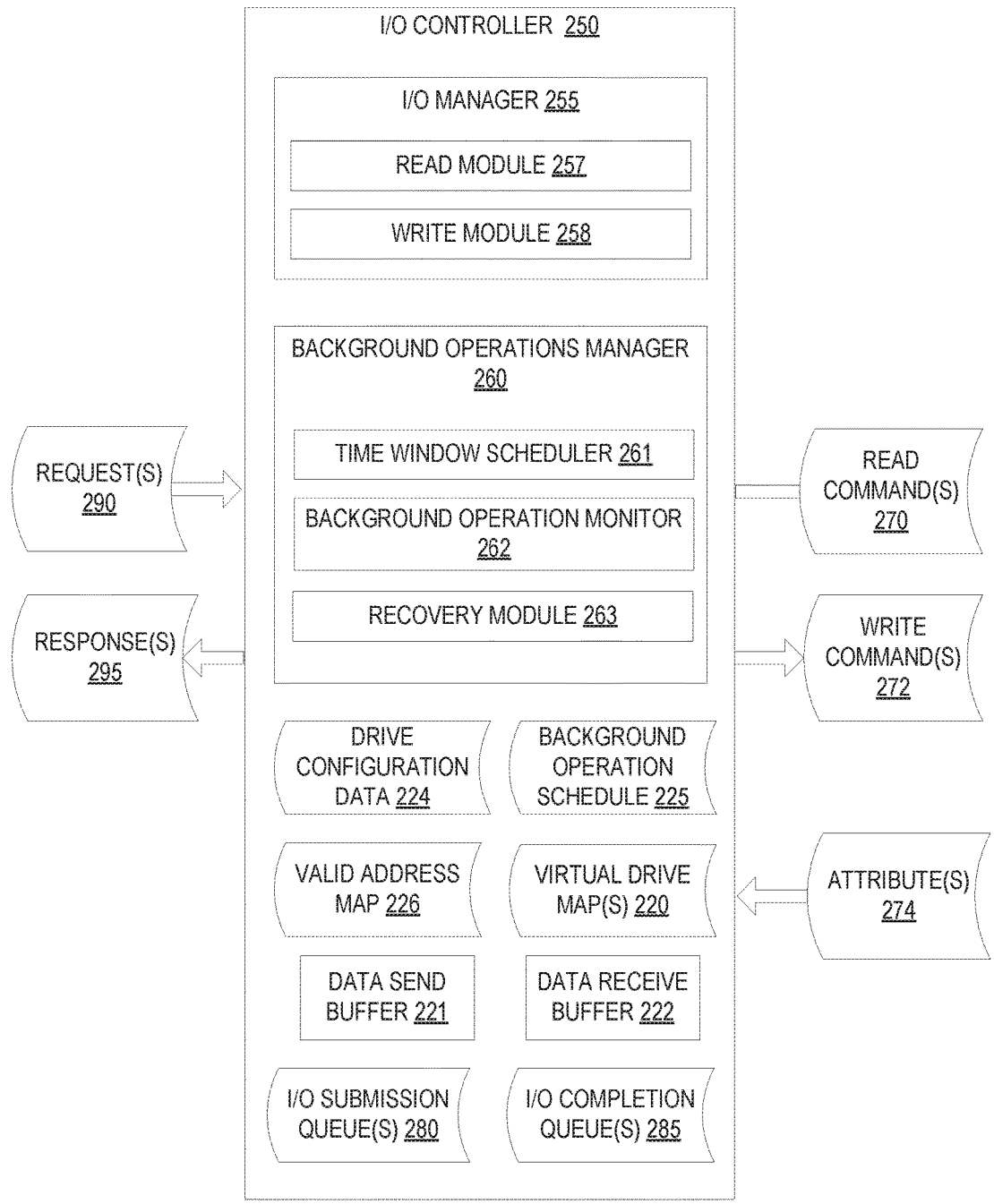
FIG. 2A is a block diagram of one embodiment of an I/O controller.

FIG. 2A is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255. The I/O manager 255 in one embodiment includes a read module 257 and a write module 258. Alternatively, the read module 257 and/or write module 258 may be distinct modules that are separate from I/O manager 255.

I/O manager 255 is responsible for communicating with host computing devices and satisfying input/output (I/O) commands such as read commands and write commands from the host computing devices. I/O controller 250 receives requests 290 from host computing devices. The requests 290 may be, for example, messages encapsulated as Ethernet packets. The received requests 290 may contain I/O commands and/or data. Responsive to receipt of a request 290 from a host, I/O manager 255 may remove an I/O command and/or data from the request and/or determine which module 257-258 should handle the data or I/O command.

In one embodiment, each of the requests 290 is an Ethernet packet having a particular format and encapsulating an I/O command such as a read command or a write command. The Ethernet packet may include a transport header identifying a destination address (e.g., a destination MAC address), a source address (e.g., a source MAC address), and a virtual local area network (VLAN) tag (if appropriate). A command payload in the I/O command may include specific command instructions, such as specific read or write instructions. The specific command instructions may be NVMe command instructions (e.g., NVMe read commands or NVMe write commands), or may include other read or write commands. A data payload in the I/O command may include data to be written to storage or data that has been retrieved from storage.

Responsive to receipt of a read command, I/O manager 255 invokes read module 257. Read module 257 is responsible for responding to read commands. In one embodiment, the command payload of the read command identifies specific logical block addresses of a virtual storage device (e.g., a virtual NVMe drive) from which data is to be read. For example, the command payload may identify a particular logical block address and a length. Read module 257 may use virtual drive map 220 for the virtual drive to determine what locations (e.g., what SSD pages) on the SSDs correspond to the logical block addresses of the virtual drive.

Read module 257 may then generate read commands 270 for each of the storage devices storing data to be read. For example, if a virtual drive maps to three physical drives, read module 257 may determine first memory pages on a first drive storing requested information, second memory pages on a second drive storing requested information and third memory pages on a third drive storing requested information. Read module 257 may then generate a first read command directed to the first memory pages of the first drive, a second read command directed to the second memory pages of the second drive, and a third read command directed to the third memory pages of the third drive. The read commands may be placed into I/O submission queues 280 for each of the drives that are managed by the I/O manager. Once a read command reaches the front of an I/O submission queue 280, read module 257 may then send the generated read command to the appropriate drive.

The drives receive the read commands and return data stored at indicated memory locations. The returned data is added to a data send buffer 221 by read module 257 until the data send buffer 221 fills or all requested data has been received. In one embodiment, the data send buffer 221 has a size that corresponds approximately to a maximum allowed size of an Ethernet packet. Once the data send buffer 221 fills, read module 257 may generate a response message 290 (e.g., a new Ethernet packet having the above identified format). Read module 257 may then encapsulate the data from the data send buffer 221 into the response 295. For example, read module 257 may generate an Ethernet packet with a transport header indicating the MAC addresses of the requesting host device and of the I/O controller 250. The Ethernet packet may also include in its payload a protocol header identifying a Data-In I/O command, may include a command payload for the Data-In I/O command and/or may include a data payload with the data from the data send buffer 221. Read module 257 may then send the response 295 to the host.

Read module 257 may continue to create and send responses incorporating retrieved data as the data send buffer 221 fills. Once all of the data has been retrieved, a final response 295 may include in its protocol header a command ID for a completion notification. The completion notification may notify the host that all data has been retrieved and that the requested read command has been satisfied. Additionally, as specific read sub-requests sent to the drives are satisfied by the drives, read module 257 may place those read sub-requests into an I/O completion queue 285. These read sub-requests may be cleared from the I/O completion queue once the retrieved data has been sent to the host.

In one embodiment, responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may use the virtual drive map 220 for the virtual drive to determine what locations (e.g., what memory pages) on the physical storage devices (e.g., physical NVMe drives) correspond to the logical block addresses of the virtual drive. Alternatively, the logical block addresses (e.g., a starting logical block address and length) may be indicated in the write command.

Following the request (e.g., Ethernet packet) encapsulating the write command, I/O controller 250 may receive additional requests identifying the particular write command and encapsulating data to be written that is associated with the write command. Since Ethernet packets have a dictated maximum size, the data to be written may be broken up into portions, where each portion can be encapsulated within a separate Ethernet packet. I/O manager 255 removes the data from each such request (e.g., from each Ethernet packet) and provides the data to write module 258. Write module 258 may add the received data extracted from the Ethernet packets (or other messages) into a data receive buffer 222.

Write module 258 may then generate write commands 272 for each of the storage devices to which the data will be written. The write commands 272 may be placed into I/O submission queues 280 for each of the drives that are managed by the I/O manager. Once a write sub-request reaches the front of an I/O submission queue 280, write module 258 may then send the generated write command to the appropriate drive.

The drives receive the write commands and write the data portions to the specified locations. The drives then return a completion notification. These completion notifications may be added to the I/O completion queue 285. Once completion notifications have been received from each of the drives to which data was written (and in some embodiments these completion notifications reach a front of the I/O completion queue), write module 258 may generate a response 295 (e.g., a new Ethernet packet having the above identified format). Write module 258 may then encapsulate the completion notification into the response 295. For example, write module 258 may generate an Ethernet packet with a transport header indicating the MAC addresses of the requesting host device and of the I/O controller 250. The Ethernet packet may also include in its payload a protocol header identifying a completion notification I/O command (also referred to as a response I/O command) and may include a command payload for the completion notification that identifies the specific I/O command that has completed. Write module 258 may then send the response 295 to the host.

I/O controller 250 may additionally include background operations manager 260 that can minimize latency in responding to read requests from hosts by reconstructing data for SSD blocks that are unavailable during background operations. In some implementations, background operations manager 260 may include a scheduling module 261, a background operations monitor 262, and a recovery module 263. Alternatively, the scheduling module 261, background operations monitor 262, and recovery module 263 may be distinct modules that are separate from background operations manager 260. In one embodiment, background operations manager 260 corresponds to a background operations manager 109A-Y of FIG. 1.

Once the read module 257 generates the read command 270 for a particular SSD, background operations manager 260 may be invoked to determine whether that SSD is executing a background operation that may render the SSD, or a particular block of that SSD, unavailable. As noted previously, a background operation may be a garbage collection operation, an erasure operation, or other similar operation that would cause the SSD render a particular block or set of blocks unavailable for a period of time. If the SSD, or the SSD block, is unavailable, background operations manager 260 may then initiate reconstruction of the data to satisfy the read command 270 without sending the command to the SSD. If the time needed to reconstruct the data is less than the time needed for the background operation to complete, background operations manager 260 may reconstruct the data to reduce the overall latency for the read command.

In one embodiment, scheduling module 261 may be invoked to generate a schedule of background operations for one or more of the SSDs in the storage server associated with I/O controller 250. In some implementations, scheduling module 261 may generate a schedule for a particular SSD. Alternatively, scheduling module 261 may generate a schedule for each SSD in the storage server, or a single schedule for all SSDs in the storage server.

To generate the schedule, scheduling module 261 may receive from an SSD one or more attributes 274 associated with a background operation to be executed by the SSD. The attributes 274 may be associated with the vendor of the SSD, the particular physical components of the SSD, or the like. In some implementations, the attributes 274 may include a duration of the background operation and/or a maximum interval between background operations (or a minimum frequency of background operations). For example, an interval attribute for a particular SSD model may indicate that a background operation should be performed by the SSD once every second. In another example, the duration attribute may indicate that a background operation should take 10 milliseconds to complete for a particular SSD model. The attributes may be received directly from the SSD based on a request sent by scheduling module 261, may be received from the SSD vendor and stored in a configuration file (e.g., drive configuration data 224), or in any other manner.

Scheduling module 261 may then generate the schedule of background operations for an SSD by using the attributes to determine a time window during which the SSD is to perform a background operation. The time window may be configured such that only a single background operation may be performed by the SSD during the window. Alternatively, the time window may be configured such that more than one background operation may be performed by the SSD during the time window. Scheduling module 261 may also determine a series of time windows based on the received attributes 274 during which multiple successive background operations can be performed by the SSD. Scheduling module 261 may then store the generated schedule in background operation schedule 225. Scheduling module 261 may generate a schedule of background operations for each of the SSDs in a storage array.

Scheduling module 261 may then proactively schedule background operations for the SSDs associated with the storage server using the generated schedule. In one embodiment, scheduling module 261 may send a notification to an SSD that includes the time window for that SSD to perform background operations. In some implementations, scheduling module 261 may send the notification to the SSD at the start of the time window, where the SSD is to perform the background operation responsive to receiving the notification. Thus, scheduling module 261 can send a notification each time a background operation is to be performed based on the generated schedule. In some implementations, scheduling module 261 may send a notification to the SSD that includes the schedule of multiple time windows allocated to the SSD for performing background operations. In this implementation, scheduling module 261 may send the notification to the SSD prior to the first time window in the schedule so that the SSD may perform the background operations according to the time windows in the schedule. By scheduling the background operations proactively, scheduling module 261 may reduce the size of the windows when scheduling background operations for an SSD. Latency for responses to read requests may be reduced As noted above, when read module 257 receives a request to read data from an SSD, it can first determine the SSD on which the data is stored. Prior to sending a command to the SSD to read the data, background operations monitor 261 may be invoked to determine whether the identified SSD is performing a background operation. Background operations monitor 261 may first determine the current time that the read request was received by read module 257. Background operations monitor 261 may then access background operation schedule 225 to determine whether the SSD is scheduled to perform the background operation within a time window that includes the current time (e.g., the current time is within the time window in the schedule).

In some implementations, if background operations monitor 262 determines that the SSD is performing a background operation on any block of the SSD, recovery module 263 may be invoked to reconstruct the data to satisfy the read request based on additional data on one or more additional SSDs in the storage server. In some implementations, background operations monitor 262 may be further configured to invoke recovery module 263 when the SSD is performing a background operation on the particular block of the SSD that contains the data to satisfy the read request, rather than just any block on the same SSD. To do so, background operations monitor 262 may first determine whether the data to satisfy the read request is located on a block of the SSD that may be unavailable during a scheduled background operation.

As noted above, a particular block of an SSD subject to a background operation (e.g., an erasure operation, garbage collection operation, etc.) may include valid pages that may be relocated to another block on the SSD during the background operation on the block. At the beginning of the background operation (e.g., at the start of the time window for the operation) background operations monitor 262 may receive a list of valid addresses that are mapped to the block of the SSD that will be unavailable during the background operation. In implementations where scheduling module 261 sends an individual notification for each background operation to the SSD, the valid addresses may be received as a response to the notification. In implementations where scheduling module 261 sends the entire schedule to the SSD, the valid addresses may be received as notifications from the SSD at the start of the background operation time window. Background operations monitor 262 may then store the list of valid addresses in valid address map 226. Valid address map 226 may be a data structure in memory, persistent storage, flash storage, etc. in I/O controller 250 that maps the logical address of the valid page to the physical address within the SSD (and the physical address to the logical address of the page).

When a read request is received, background operations monitor 262 may determine that the data needed to satisfy the read request is located at one or more of the valid addresses by accessing the valid address map 226. Prior to sending the read command to the SSD, read module 257 can determine the address(es) of the page(s) that are needed to satisfy the read request. Background operations monitor 262 may use the address(es) of the page(s) to access the valid address map 226 to determine if the SSD block that stores the page(s) will be unavailable during the background operation.

Responsive to determining that the data to satisfy the read request is located on the block of the SSD that is unavailable during the background operation, background operation monitor 262 may then invoke recovery module 263 to reconstruct the data for the request as described below. In some implementations, responsive to determining that the data is located on a block of the SSD that will be available during the background operation (e.g., the page address is not present in the valid address map 226), background operation monitor 262 may indicate to read module 257 that the read command may be forwarded to the SSD to retrieve the data from the appropriate SSD block.

In some implementations, the time the read request is received relative to an executing background operation may be taken into account. Upon receiving a read request, if background operations monitor 262 determines that the data to satisfy the request is located on a block that is unavailable due to an executing background operation, background operations monitor 262 may wait for the background operation to complete rather than invoke recovery module 263 if the background operation is nearly complete. Background operation monitor 262 may make this determination by determining the amount of time to reconstruct the data. This amount of time may be determined based on stored historical statistics for recovery operations, based on manufacturer provided information, or the like. Background operations monitor 262 may then determine the amount of time remaining until the time window for the background operation for the affected SSD block has closed. If the amount of time remaining until the time window is closed is greater than the time to reconstruct the data, background operations monitor 262 can invoke recovery module 263. Conversely, if the amount of time to reconstruct the data is greater than the amount of time remaining until the time window is closed, background operations monitor 262 can indicate to read module 257 that the read command may be forwarded to the SSD to retrieve the data from the appropriate SSD block (e.g., by waiting for the background operation to complete rather than reconstruct the data).

Recovery module 263 may reconstruct the needed data by executing a formula to recompute the data using standard recovery algorithms (e.g., Reed-Solomon). In an illustrative example, recovery module 263 may determine the logical block address of the physical drive (e.g., the physical LBA) associated with the pending read command. Recovery module 263 may then determine logical block addresses containing data on multiple other physical drives that can be used to reconstruct the data of the logical block address, and may perform reads on those additional logical block addresses to retrieve parity data and/or associated data. Recovery module 263 may then execute a recovery formula to recompute the data for the portion of the physical drive needed to satisfy the sub-request using the other retrieved data. Once the data has been recomputed, recovery module 263 may then add the recovered data to data receive buffer 222 so that it may be used when constructing response 295 for return to the host computing device.

When each of the pending commands associated with a received request 290 has completed via either receipt of a successful retrieval from an available SSD block or via successful recovery of an unavailable block, I/O controller 250 may combine the data in data send buffer 221 for the sub-requests and return response 295 to the host computing device.

Figure 2B:
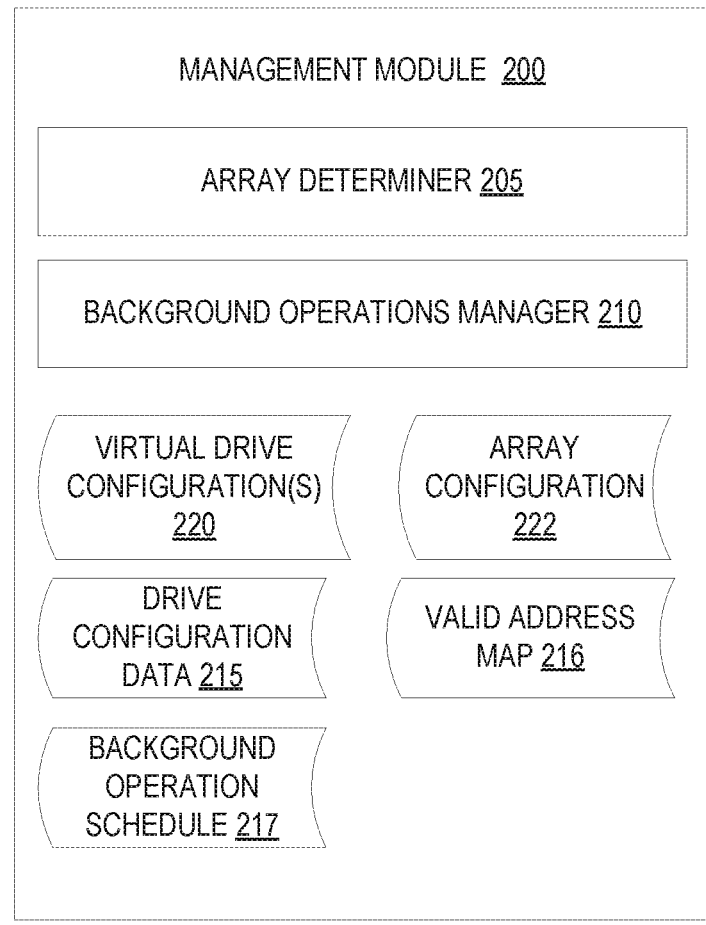
FIG. 2B is a block diagram of one embodiment of a management module.

FIG. 2B is a block diagram of one embodiment of a management module 200 showing logical modules that may be loaded into and executed by a processing device of management module 200. Alternatively, management module 200 may include one or more physical modules (e.g., an integrated circuit (IC) designed with described modules or a configurable logic such as a field programmable gate array (FPGA) configured to have the modules). In one embodiment, management module 200 includes the modules of an array determiner 205 and a background operations manager 210. Alternatively, the functionality of the array determiner 205 and/or background operations manager 210 may be divided into additional modules or may be combined into a single module. In one embodiment, management module 200 corresponds to management module 115 of FIG. 1.

Array determiner 205 identifies available storage devices and may determine how those storage devices are to be configured into an array, and may store such information as array configuration 222. Array determiner 205 additionally determines how to divide the array of storage devices into virtual drives, and this information may be included in virtual drive configuration(s) 220. Array determiner 205 may determine how many virtual drives to create, the sizes of those virtual drives, and what physical addresses of the storage devices to allocate to each virtual drive. Once the configurations for the virtual drives are determined, array determiner 205 sends the virtual drive configurations 220 to I/O controllers. The I/O controllers may then use the received virtual drive configurations 220 to establish and maintain the virtual drives.

Background operations manager 210 may be responsible for managing background operations for the SSDs of a storage server. Background operations manager 210 may receive attribute information from the SSDs on the storage server to determine background operations schedules for each of the SSDs. In one embodiment, background operations manager 210 may store the received attribute information in drive configuration data 215 and use that information to generated schedules in background operation schedule 217. Attribute information may include the manufacturer identifier of each SSD (e.g., a device identifier), the capacity of the drive, the duration of a background operation, the interval between background operations, or other similar device characteristics. This information may be identified by sending a message to the drive and receiving a response. Alternatively, this information may be identified when the SSD is added to the storage server. The information may also be received from the vendor and stored in drive configuration data 215 prior to adding the SSD to the storage server.

Background operations manager 210 may generate the schedule of background operations for a SSD by using the attributes to determine a time window during which the SSD is to perform a background operation. The time window may be configured such that only a single background operation may be performed by the SSD during the window. Alternatively, the time window may be configured such that more than one background operation may be performed by the SSD during the time window. Background operations manager 210 may also determine a series of time windows based on the received attributes during which multiple successive background operations can be performed by the SSD.

Background operations manager 210 may then proactively schedule background operations for the SSDs associated with the storage server using the generated schedule. In one embodiment, background operations manager 210 may send a notification to the SSD that includes the time window. In some implementations, background operations manager 210 may send the notification at the time each background operation is to be performed based on the generated schedule. In some implementations, background operations manager 210 may send a notification to the SSD that includes the schedule of multiple time windows allocated to the SSD for performing background operations.

At the beginning of a background operation (e.g., at the start of the time window for the operation) background operations monitor 210 may receive a list of valid addresses that are mapped to the block of the SSD that will be unavailable during the background operation. In implementations where background operations manager 210 sends an individual notification for each background operation to the SSD, the valid addresses may be received as a response to the notification. In implementations where background operations manager 210 sends the entire schedule to the SSD, the valid addresses may be received as notifications from the SSD at the start of the background operation time window. Background operations manager 210 may then store the list of valid addresses in valid address map 216. Valid address map 216 may be a data structure in memory, persistent storage, flash storage, etc. in I/O controller 250 that maps the logical address of the valid page to the physical address within the SSD (and the physical address to the logical address of the page).

When a read request is received by an I/O controller, the I/O controller may access valid address map 216 to determine whether the data needed to satisfy the read request is located at one or more of the valid address by accessing the valid address map 226. The I/O controller may access the valid address map 216 directly (as described above with respect to FIG. 2A), or may send a request to management module 200 and receive a response.

Figure 3:
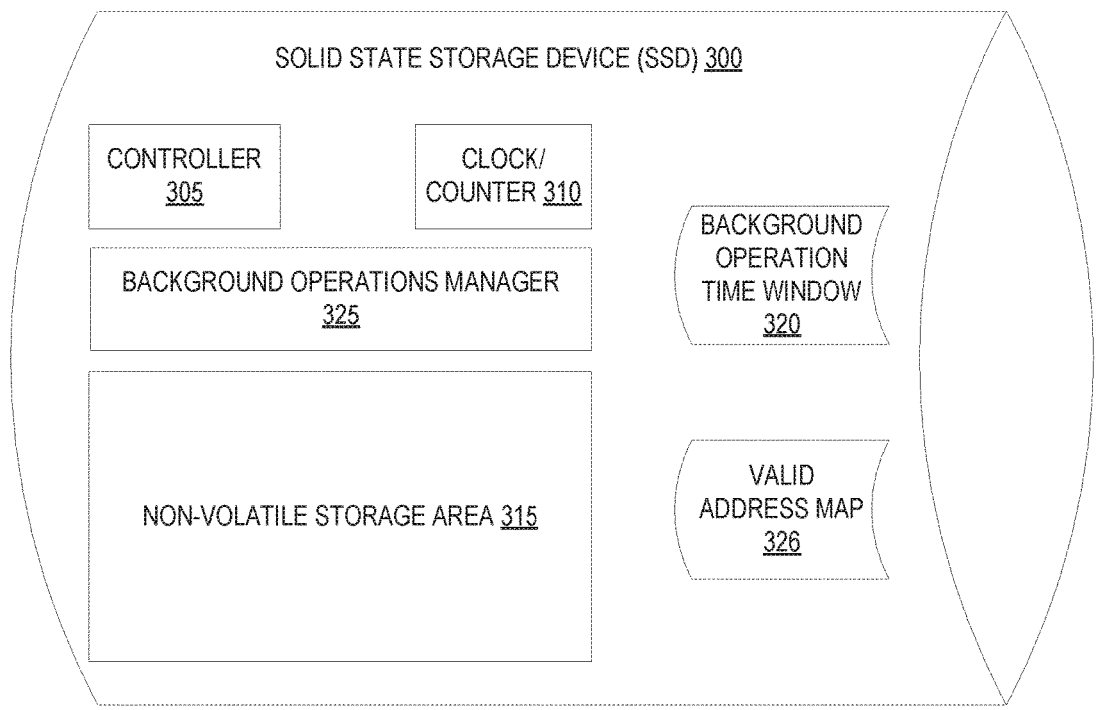
FIG. 3 is a block diagram of one embodiment of a solid state storage device (SSD).

FIG. 3 is a block diagram of a solid state storage device (SSD) 300 that is configured to comply with an assigned background operation time window 320. In one embodiment, solid state storage device 300 corresponds to SSDs 150A-Z of FIG. 1. Solid state storage device 300 may include a controller 305, a clock or counter 310, a background operations manager 325 and a non-volatile storage area 315. Controller 305 may be responsible for receiving I/O commands from remote devices (e.g., from an I/O controller 108A-Y of FIG. 1) and responding to such I/O commands. For example, controller 305 may write data to non-volatile storage area 315 and read data from non-volatile storage area 315.

Background operations manager 325 may include logic for monitoring background operations of SSD 300 and performing data reconstruction to reduce read latency, as have previously been described. In some implementations, background operations manager 325 may be a component of controller 305. Background operations manager 325 may receive a notification from an array manager or I/O controller specifying a background operation time window 320 for performing the background operation (e.g., an erase operation, a garbage collection operation, etc.). Background operations manager 325 may then store the background operation time window 320 in a memory (e.g., a volatile or non-volatile memory) of SSD 300. In some implementations, background operations manager 325 may receive a schedule of background operations to be performed by SSD 300 during corresponding time windows, where each background operation is to be performed based on a duration and time interval as described above with respect to FIG. 2A. Background operations manager 325 may then perform multiple background operations based on the schedule.

Background operations manager 325 may wait until the background operation time window 320 to perform the background operations. Background operations manager 325 may determine based on a count of the clock or counter 310 when an assigned background operations time window begins and ends. Alternatively, Background operations manager 325 may receive a notification from the array manager or I/O controller to initiate a background operation.

At the start of the assigned background operation time window, SSD 300 may determine whether a background operation (e.g., an erase operation, a garbage collection operation, etc.) should be performed. This determination may be made, for example, by determining whether any blocks of the non-volatile storage area 315 include more than a threshold number of invalid memory pages. If more than the threshold number of memory pages in any block are invalid, then controller 305 may determine that background erase operations should be performed for that block. If this determination is made, then controller 305 performs the background operation on the determined block or blocks during the background operation time window. Otherwise, controller 305 may determine not to perform any background operations during the background operations time window. Alternatively, controller 305 may receive a notification from an array manager or I/O controller to initiate the background operation.

In one embodiment, SSD 300 may perform a background erase operation on a block among a plurality of blocks in the non-volatile storage area 315. Background operations manager 325 may first determine a physical address associated with the block to be erased. Background operations manager 325 may then identify a set of pages from the block to be erased. In some implementations, background operations manager 325 may identify a set of valid pages on the block that should be moved to another block within the non-volatile storage area 315. Background operations manager 325 may store the addresses of the valid pages in a data structure within the SSD 300 such as valid address map 326. The valid address map 326 may be used to reconstruct data for received read requests directed to any of the valid pages. During the background erase operation, background operations manager 325 may move the set of valid pages to another block, and perform the erase operation on the block.

In one embodiment, background operations manager 325 sends the valid address map 326 to one or more I/O controllers. The valid address map 326 may be sent prior to beginning background operations or during execution of background operations. The I/O controllers may then use the valid address map to determine how to respond to read requests for data stored on the SSD 300.

In one embodiment, background operations manager 325 uses the valid address map 326 to reconstruct data to respond to read requests received while a block that contains that data is undergoing a background operation. SSD 300 may receive a request from an I/O controller (e.g., such as an I/O controller 108A-Y of FIG. 1, or an I/O controller 250 of FIG. 2) to read data from at least one page of a plurality of pages included in a block being erased. In some implementations, the read request may include address information for the requested page that background operations manager 325 can use to access the valid address map 326 to determine if the requested page(s) are unavailable due to an executing background operation. Background operations manager 325 may then initiate recovery of the page(s) to reconstruct the data.

In some implementations, the time the read request is received relative to an executing background operation may be taken into account. Upon receiving the read request, if background operations manager 325 determines that the data to satisfy the request is located on a block that is unavailable due to an executing background operation, background operations manager 325 may wait for the background operation to complete rather than initiate reconstruction if the background operation is nearly complete. Background operation manager 325 may make this determination by determining the amount of time needed to reconstruct the data. This amount of time may be determined based on stored historical statistics for recovery operations, based on manufacturer provided information, or the like.

Background operations manager 325 may then determine the amount of time remaining until the time window for the background operation for the affected SSD block has closed. If the amount of time remaining until the time window is closed is greater than the time to reconstruct the data, background operations manager 325 can initiate recovery of the needed page(s). Conversely, if the amount of time to reconstruct the data is greater than the amount of time remaining until the time window is closed, background operations manager 325 can retrieve the data from the appropriate SSD block (e.g., by waiting for the background operation to complete rather than reconstruct the data). When the reconstruction of the data for the read request has completed, background operations manager 325 may return the data to the requesting I/O controller.

In one embodiment, background operations manager 325 may perform an erase operation on no more than one block in the non-volatile storage area 315 at a time. By limiting the erase operations in this way, background operations manager 325 can efficiently reconstruct data for received read requests using data stored within SSD 300. This can prevent one recovery operation from performing a second recovery operation to complete the data reconstruction. For example, if background operations manager 325 initiates reconstruction of a page from a block to satisfy a read request, and the data needed to complete the reconstruction is located on a second block within the non-volatile storage area 315 that is also locked due to another background operation that is also being performed, a second recovery operation may be needed to reconstruct the data for the first recovery operation. By limiting the number of erase operations, background operations manager 325 can prevent performance degradation due to recursive recovery operations.

Figure 4:
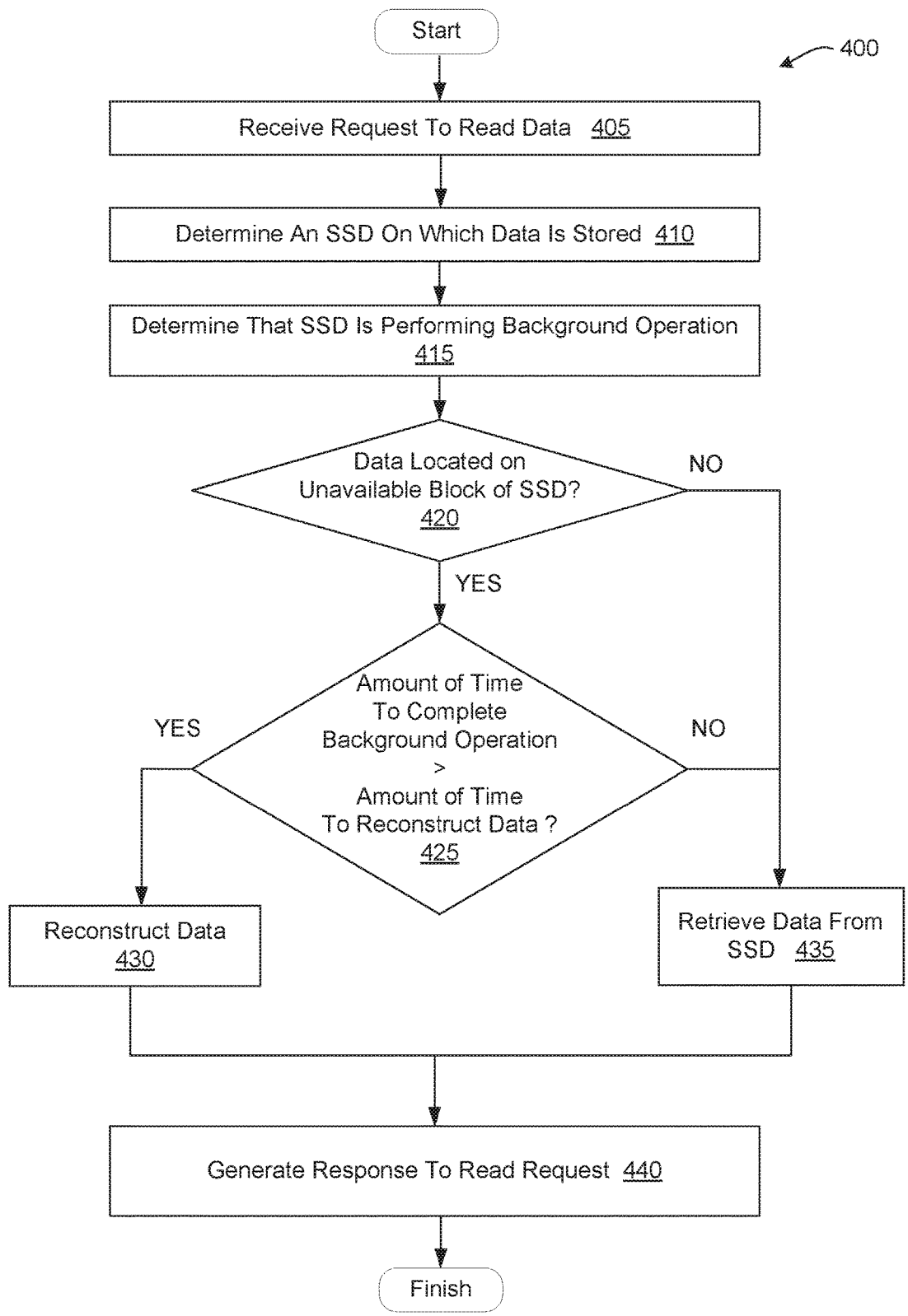
FIG. 4 is a flow diagram of one embodiment for a method of minimizing read latency for solid state drives.
Figure 5:
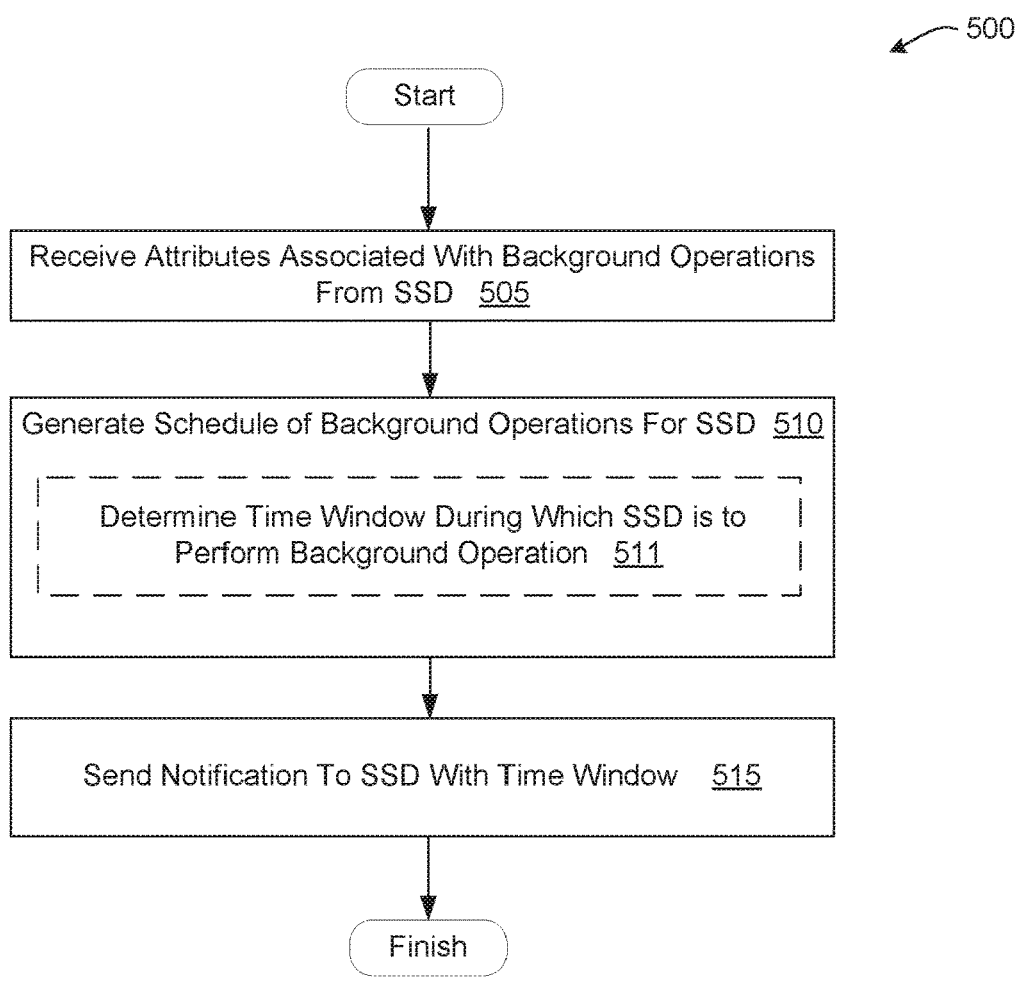
FIG. 5 is a flow diagram of one embodiment for a method of generating a schedule of background operations for an SSD.
Figure 6:
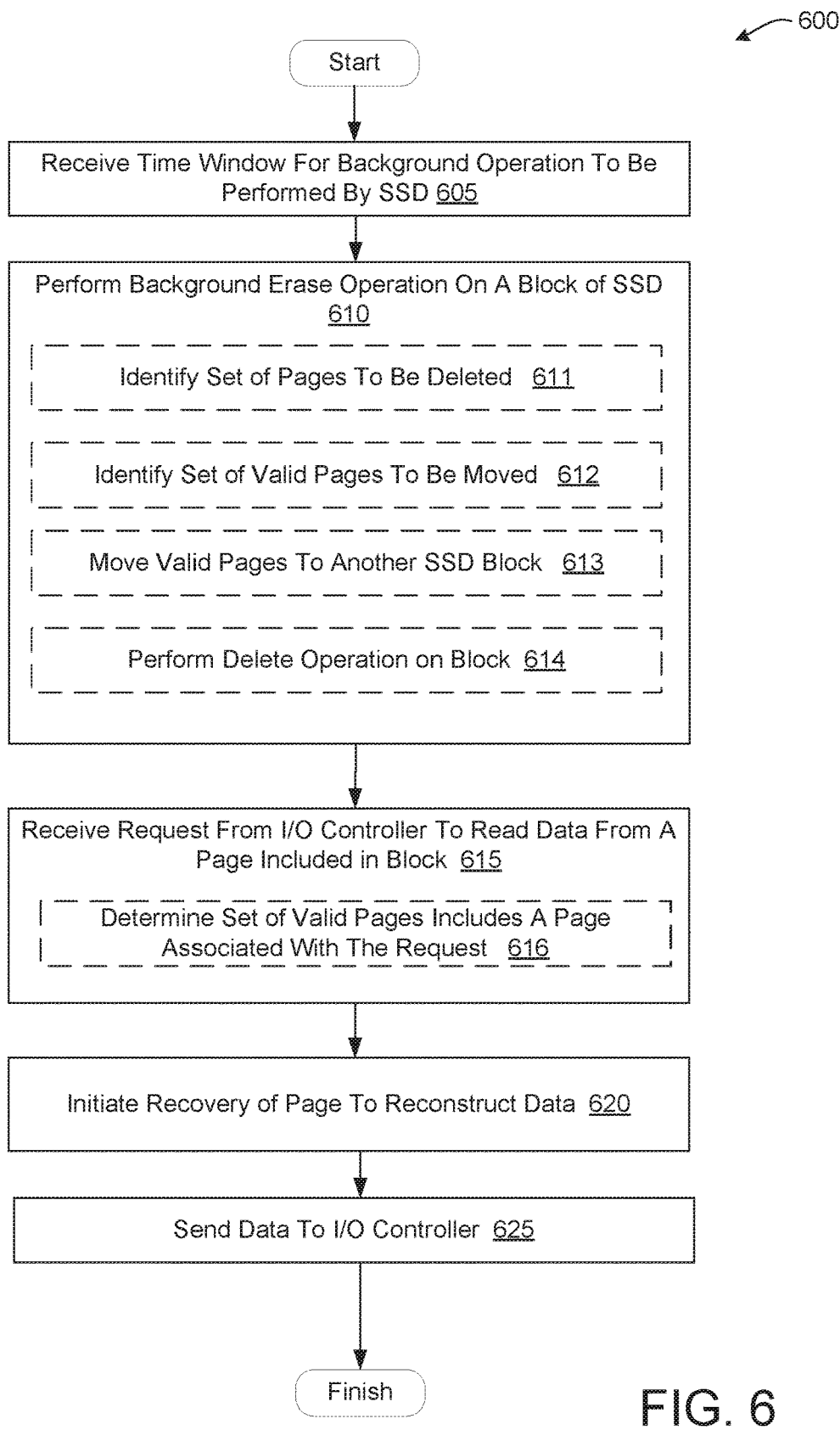
FIG. 6 is a flow diagram of one embodiment for a method of reconstructing data for a read request by an SSD.

FIGS. 4-6 are flow diagrams of various implementations of methods related to providing reduced read latency for SSDs. The methods are performed by processing logic that may include hardware (circuitry, dedicated logic, etc.), software (such as is run on a general purpose computer system or a dedicated machine), or a combination of both. Some methods may be performed by a background operations manager such as background operation managers 109A-Y of FIG. 1, background operations manager 260 of FIG. 2A, background operation manager 210 of FIG. 2B, or background operations manager 325 of FIG. 3. Some methods may be performed by an I/O controller such as any I/O controller 108A-Y of FIG. 1, or I/O controller 250 of FIG. 2. Some methods may be performed by a management module such as management module 115 of FIG. 1, or management module 200 of FIG. 2. Some methods may be performed by a component of an SSD such as SSD 300 of FIG. 3.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram of one embodiment for a method 400 of minimizing read latency for solid state drives. Method 400 may be performed, for example, by an I/O controller. At block 405 of method 400, processing logic receives a request to read data. At block 410, processing logic determines an SSD on which the data is stored. At block 415, processing logic determines that the SSD identified at block 410 is performing a background operation. Processing logic may determine that the SSD is performing a background operation based on a schedule of background operations generated for the SSD. In one embodiment, processing logic may first determine the current time of the read request. Processing logic may then access the generated schedule to determine that the SSD is scheduled to perform a background operation within a particular time window. If the current time of the read request is within the time window for the background operation, processing logic may make the determination that the SSD is performing a background operation. In some implementations, processing logic may generate a schedule of background operations as described below with respect to FIG. 5.

At block 420, processing logic determines whether the data to satisfy the request received at block 410 is located on a block of the SSD that will be unavailable during the background operation. In one embodiment, processing logic may make this determination based on a list of valid addresses that are mapped to the block of the SSD that will be unavailable during the background operation. Processing logic may receive this list of valid addresses from the SSD when the SSD initiates the background operation, and subsequently store them until the background operation has completed. Processing logic may determine that the data to satisfy the read request is unavailable if the data is located at one or more of the valid addresses received from the SSD. If so, then processing may continue to block 425. Otherwise, processing may continue to block 435 to retrieve the data from the SSD.

At block 425, processing logic determines whether the amount of time to complete the background operation is greater than the amount of time to reconstruct the data with a recovery operation. If so, then processing logic may continue to block 430. Otherwise, processing logic can wait for the background operation to complete and proceed to block 435 to retrieve the data from the SSD. At block 440 processing logic generates a response to the read request that includes the data that was either reconstructed at block 430 or retrieved at block 435. After block 440, the method of FIG. 4 terminates.

FIG. 5 is a flow diagram of one embodiment for a method 500 of generating a schedule of background operations for a SSD. Method 500 may be performed, for example, by an I/O controller. At block 505 of method 500, processing logic may receive attributes associated with background operations from an SSD. The attributes may include the manufacturer identifier of each SSD (e.g., a device identifier), the capacity of the drive, the duration of a background operation, the interval between background operations, or other similar device characteristics. This information may be identified by sending a message to the drive and receiving a response. Alternatively, this information may be received when the SSD is added to the storage server. The information may also be received from the vendor and stored in drive configuration data 215 prior to adding the SSD to the storage server.

At block 510, processing logic generates a schedule of background operations for the SSD based on the attributes received at block 505. In on embodiment, processing logic may execute block 511 to determine a time window during which the SSD is to perform a background operation. The time window may be determined such that only a single background operation may be performed by the SSD during the window. Alternatively, the time window may be determined such that more than one background operation may be performed by the SSD during the time window. In some implementations, processing logic may determine a series of time windows based on the received attributes during which multiple successive background operations can be performed by the SSD.

At block 515, processing logic may send a notification to the SSD with the time window. In some implementations, processing logic may send the notification at the time each background operation is to be performed based on the generated schedule. In some implementations, processing logic may send a notification to the SSD that includes the schedule of multiple time windows allocated to the SSD for performing background operations. After block 515, the method of FIG. 5 terminates.

FIG. 6 is a flow diagram of one embodiment for a method 600 of reconstructing data for a read request by an SSD. Method 600 may be performed, for example, by a component of a SSD. At block 605 of method 600, processing logic receives a time window for a background operation to be performed by an SSD. A background operation may be an erase operation, a garbage collection operation, or the like. At block 610, processing logic performs a background erase operation on a block of the SSD. The background erase operation may be performed during the time window. In one embodiment, processing logic may invoke blocks 611-614 to perform a background erase operation.

At block 611, processing logic identifies a set of pages to be deleted from the block. At block 612, processing logic identifies a set of valid pages to be moved to another block of the SSD. Processing logic may store the addresses of the valid pages in a data structure within the SSD to be used when determining whether to reconstruct data for received read requests directed to any of the valid pages. At block 613, processing logic moves the valid pages to another block of the SSD. At block 614, processing logic performs the delete operation of the block.

At block 615, processing logic receives a request from an I/O controller to read data from at least one page included in the SSD block being erased by block 610. In one embodiment, processing logic may invoke block 616 to determine that the set of valid pages identified at block 612 includes a page associated with the data to satisfy the read request received at block 615. At block 620, processing logic initiates recovery of the page(s) to reconstruct the data to satisfy the read request. In some implementations, prior to initiating the recovery operation, processing logic first determines whether the background operation is nearly complete. To do so, processing logic determines the amount of time to reconstruct the data for the request. Processing logic then determines the amount of time remaining until the time window for the background operation is closed. If the time remaining until the time window is closed is greater than the amount of time to reconstruct the data, processing logic may initiate data recovery. Otherwise, processing logic may retrieve the data after the background operation has completed.

At block 625, processing logic sends the reconstructed data to the requesting I/O controller. After block 625, the method of FIG. 6 terminates.

Figure 7:
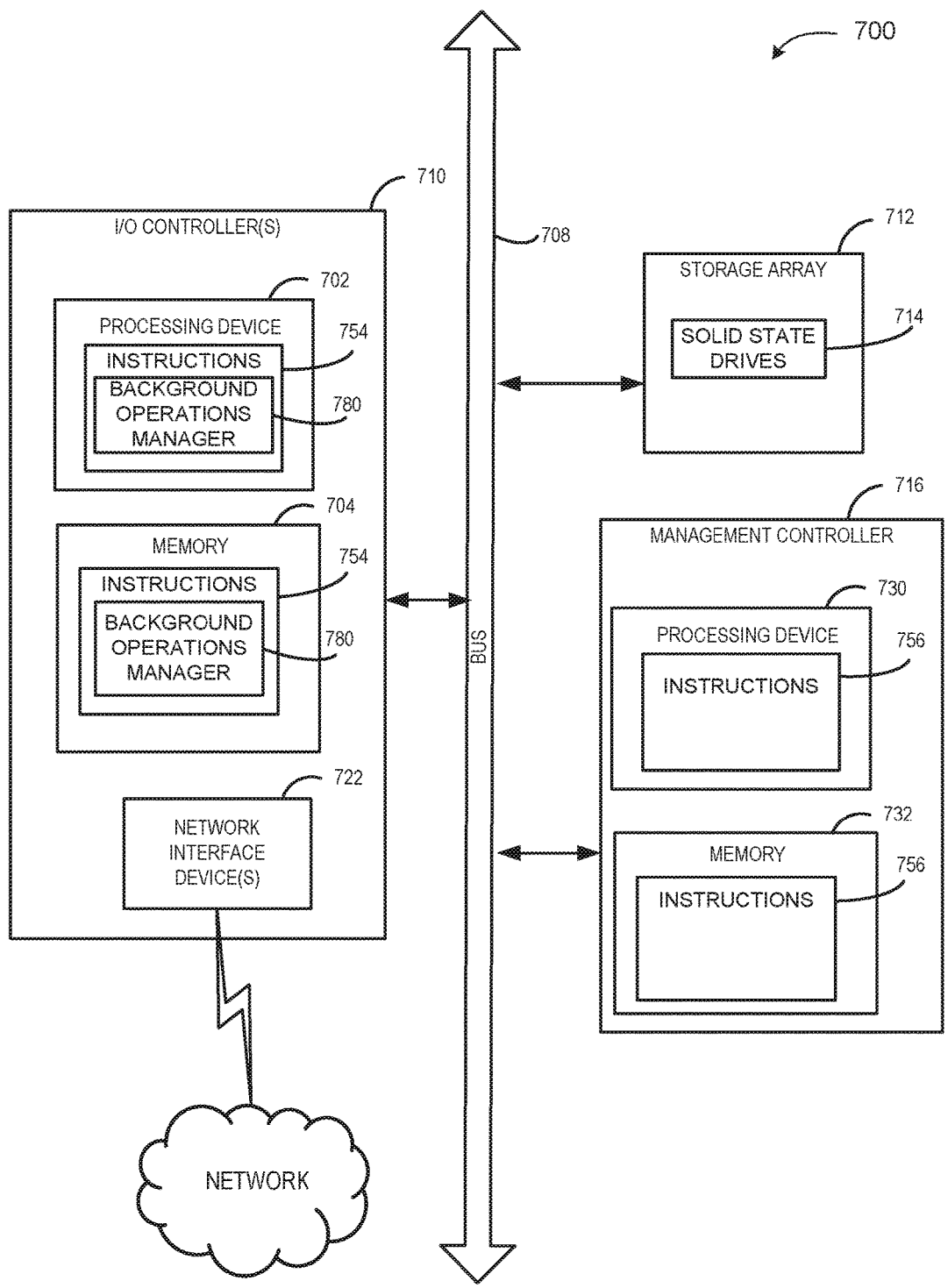
FIG. 7 illustrates an example computing device, in accordance with one embodiment.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes one or more I/O controllers 710, a storage array 712, and a management controller 716 (or multiple management controllers 716), which communicate with each other via a bus 708. Bus 708 may include one or more switches (e.g., switch 110 of FIG. 1) and one or more storage fabrics (also referred to as backplane fabrics). Each storage fabric includes hardware (e.g., switches, etc.) that connects I/O controllers 710 to SSDs 714. Each storage fabric may include a fabric board (e.g., a printed circuit board (PCB) that includes multiple hardware components. Alternately, multiple storage fabrics may be part of a single backplane printed circuit board (PCB). Each storage fabric enables any I/O controller 710 to connect to any SSD 714. Each storage fabric may be independent of other storage fabrics, using its own hardware, ports, connections, etc. that are distinct from those used by the other storage fabrics. Accordingly, if any component in a storage fabric fails and causes that storage fabric to fail, the I/O controllers 710 may continue to maintain connections to the SSDs 714 via an alternative storage fabric.

Each I/O controller 710 represents a device configured to connect one or more host computing devices to one or more SSDs (e.g., I/O controller 108A-Y of FIG. 1). An I/O controller 710 includes a processing device 702, and a memory 704 (e.g., read-only memory (ROM), flash memory, dynamic random access memory (DRAM) such as synchronous DRAM (SDRAM) or Rambus DRAM (RDRAM), etc.). The I/O controller 710 may further include one or more network interface devices 722 to connect to a network. In one embodiment, each I/O controller 710 is a system on a chip (SoC) including processing device 702, memory 704, and one or more network interface devices 722.

Management controller 716 represents a device configured to manage a storage fabric. Management controller 716 may include a memory 732 having instructions 756 and a processing device 730 that loads and executes those instructions 756. Memory 732 may be read-only memory (ROM), flash memory, dynamic random access memory (DRAM) such as synchronous DRAM (SDRAM) or Rambus DRAM (RDRAM), etc. In one embodiment, management controller 716 is a system on a chip (SoC) including processing device 730 and memory 732.

Processing device 702 and/or processing device 730 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute processing logic (e.g., instructions 754) for performing operations discussed herein.

The memory 704 may be a machine-readable storage medium (or more specifically a computer-readable storage medium) on which is stored one or more sets of instructions 754 embodying any one or more of the methodologies or functions described herein. The instructions 754 may also reside, completely or at least partially, within the processing device 702 during execution thereof by the I/O controller 710, the processing device 702 also constituting computer-readable storage media. Alternatively, or additionally, the instructions 754 may be resident on a solid state storage drive (e.g., a solid state storage drive 714) and/or a hard disk drive connected to bus 708.

The instructions may include a background operations manager 780 (e.g., as described above with respect to FIGS. 1-2B), and/or a software library containing methods that call a background operations manager 780. While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 712 represents a device that contains a group of solid state drives (SSDs) 714. Storage array 712 may arrange SSDs 714 into logical redundant storage containers, or a redundant array of independent disks (RAID). The storage array 712 may distribute data across the SSDs 714 in one of several RAID levels to provide different levels of redundancy and performance. In some implementations, storage array 712 may include one group of SSDs 714 for data and another group of SSDs 714 for recovery purposes. SSDs 714 may be SAS/SATA drives, non-volatile memory express (NVMe) drives, small computer system interface (SCSI) over PCIe (SOP) drives, or solid state drives that communicate using different protocols. The number of SSDs 714 included in storage array 712 may be less than 10 to more than 100. The SSDs 714 may have the same or different storage capacities.

The management controller 716 may be a device configured to perform particular operations with regards to management of the array of SSDs 714 in storage array 712. Management controller 716 may include a volatile and/or non-volatile memory to store one or more sets of instructions 754 embodying any one or more of the methodologies or functions described herein.

The modules, components and other features described herein (for example in relation to FIG. 2A) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "sending", "generating", "reconstructing", "determining", "retrieving", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device of a storage server that manages a plurality of solid state storage devices (SSDs), a request to read data;
   determining a first SSD of the plurality of SSDs on which the data is stored;
   determining that the first SSD is performing a background operation;
   determining whether the data is located on a block of the first SSD that will be unavailable during the background operation;
   responsive to determining that the data is located on the block of the first SSD that will be unavailable during the background operation, reconstructing the data by the processing device based on additional data on one or more remaining SSDs of the plurality of SSDs; and
   generating a response to the request, the response comprising the data.

2. The method of claim 1, wherein determining that the first SSD is performing the background operation comprises:
   determining a current time; and
   determining, from a schedule of background operations for the plurality of SSDs, that the first SSD is scheduled to perform the background operation within a first time window, wherein the current time is within the first time window.

3. The method of claim 2, further comprising:
   generating the schedule of background operations, wherein generating the schedule of background operations comprises determining the first time window during which the first SSD is to perform the background operation; and
   sending, to the first SSD, a notification comprising the first time window.

4. The method of claim 3, wherein sending the notification comprises:
   sending the notification to the first SSD at a start of the first time window, wherein the first SSD is to perform the background operation responsive to receiving the notification.

5. The method of claim 3, wherein sending the notification comprises:
   sending the notification to the first SSD prior to the first time window, wherein the notification comprises a schedule of time windows allocated to the first SSD for performing background operations, the schedule comprising the first time window.

6. The method of claim 3, further comprising:
   receiving, from the first SSD, one or more attributes associated with the background operation to be executed by the first SSD, wherein the first time window is determined based at least in part on the one or more attributes.

7. The method of claim 6, wherein the one or more attributes comprise at least one of a duration of the background operation or a maximum time interval for executing the background operation.

8. The method of claim 2, wherein determining that the SSD is performing the background operation comprises:
   determining a first amount of time to reconstruct the data;
   determining a second amount of time remaining until the first time window is closed; and
   determining that the second amount of time is greater than the first amount of time.

9. The method of claim 1, wherein the background operation is at least one of a garbage collection operation or an erasure operation.

10. The method of claim 1, further comprising:
    responsive to determining that the data is located on a second block of the first SSD that will be available during the background operation, retrieving the data from the second block.

11. The method of claim 1, further comprising:
    receiving, from the first SSD, a list of valid addresses that are mapped to the block of the first SSD that will be unavailable during the first background operation; and
    storing the list of valid addresses.

12. The method of claim 11, further comprising:
    determining that the data is located at one or more of the valid addresses.

13. A solid state storage device (SSD), comprising:
    a non-volatile storage area divided into a plurality of pages each having a first size, wherein the plurality of pages are grouped into a plurality of blocks each having a larger second size, wherein read operations are performed on individual pages of the plurality of pages, and background erase operations are performed on individual blocks of the plurality of blocks;
    a device controller coupled to the non-volatile storage area, the device controller to:
      perform a background erase operation on a first block of the plurality of blocks;
      receive a request from an input-output controller to read data from at least one page of the plurality of pages that is included in the first block on which the background erase operation is performed;
      initiate recovery of the at least one page to reconstruct the data; and
      send the data to the input-output controller.

14. The SSD of claim 13, wherein the device controller is further to:

receive a notification comprising a time window allocated to the SSD for performing the background erase operation; and determine a physical address associated with a first block of the plurality of blocks that is to be erased.

15. The SSD of claim 14, wherein the device controller is further to:

determine a first amount of time to reconstruct the data;

determine a second amount of time remaining until the time window is closed; and determine that the second amount of time is greater than the first amount of time.

16. The SSD of claim 13, wherein the device controller is further to:

receive a schedule of background erase operations to be performed by the SSD during corresponding time windows, wherein each background erase operation is to be performed based on a duration and a time interval; and perform one or more additional background erase operations based on the schedule.

17. The SSD of claim 13, wherein the device controller is further to:

identify a first set of pages from the first block to be deleted;

identify a second set of pages from the first block to be moved to one or more other blocks of the plurality of blocks;

move the second set of pages to the one or more other blocks;

perform a delete operation on the first block; and determine that the second set of pages comprises the at least one page associated with the request.

18. The SSD of claim 13, wherein the background erase operation is performed on no more than one block of the plurality of blocks at a time.

19. A non-transitory computer readable storage medium having instructions that, when executed by a processing device of a storage server that manages a plurality of solid state storage devices (SSDs), cause the processing device to perform operations comprising:

receiving, by the processing device, a request to read data;

determining a first SSD of the plurality of SSDs on which the data is stored;

determining that the first SSD is performing a background operation;

determining whether the data is located on a block of the first SSD that will be unavailable during the background operation;

responsive to determining that the data is located on the block of the first SSD that will be unavailable during the background operation, reconstructing the data by the processing device based on additional data on one or more remaining SSDs of the plurality of SSDs; and generating a response to the request, the response comprising the data.

20. The non-transitory computer readable storage medium of claim 19, the operations further comprising:

responsive to determining that the data is located on a second block of the first SSD that will be available during the background operation, retrieving the data from the second block.

* * * * *